No. 863,488. PATENTED AUG. 13, 1907.
J. ALLEND.
VEHICLE TIRE.
APPLICATION FILED MAR. 19, 1906.
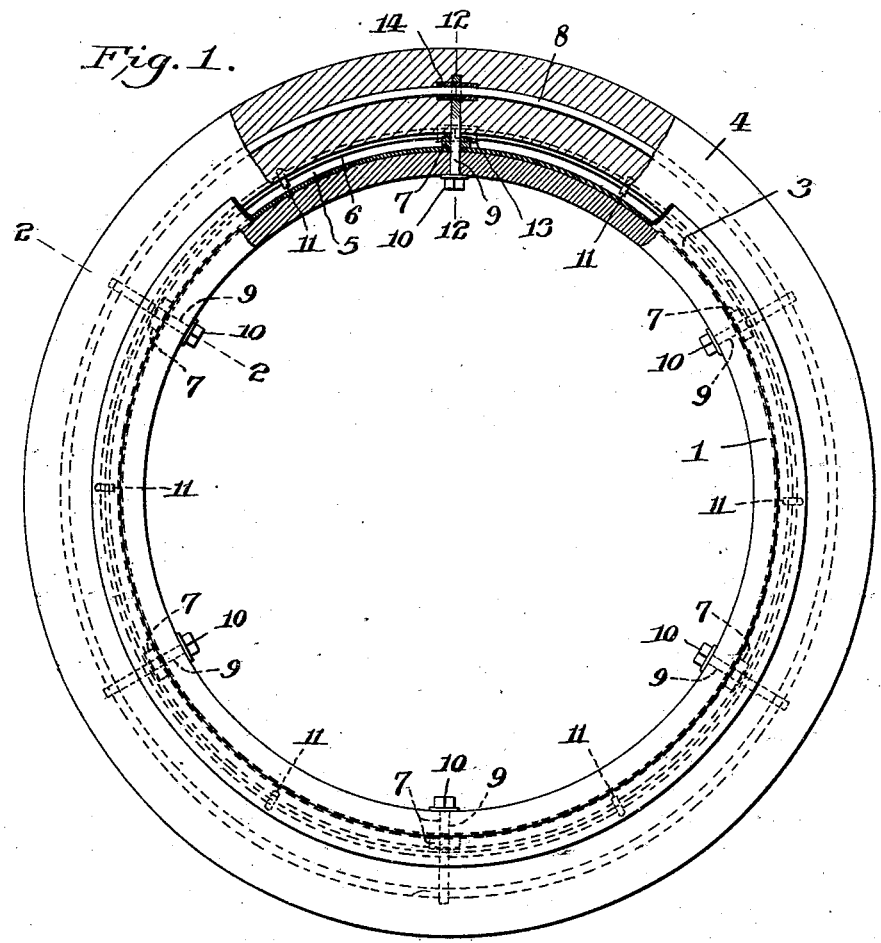
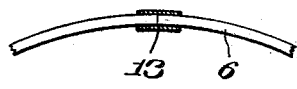
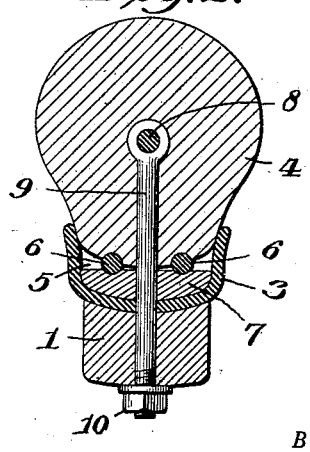
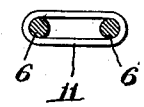
WITNESSES:
INVENTOR

UNITED STATES PATENT OFFICE.

JOSEPH ALLEND, OF PHILADELPHIA, PENNSYLVANIA.

VEHICLE-TIRE.

No. 863,488.  Specification of Letters Patent.  Patented Aug. 13, 1907.

Application filed March 19, 1906. Serial No. 306,707.

*To all whom it may concern:*

Be it known that I, JOSEPH ALLEND, a citizen of the United States, residing at Philadelphia, in the county of Philadelphia and State of Pennsylvania, have invented certain new and useful Improvements in Vehicle-Tires, of which the following is a specification.

The object of my invention is to provide a simple and efficient spring-supported, resilient wheel tire for vehicles.
The invention consists in the novel construction and combinations of parts hereinafter fully described and claimed.

In the drawings:—Figure 1 is a sectional elevation of a portion of a wheel provided with a tire embodying my invention. Fig. 2 is a transverse sectional view thereof as on the line 2—2 of Fig. 1. Fig. 3 is a detail of one of the spring rings. Fig. 4 is a detail of the means for preventing lateral separation of the spring rings.

1 designates a wheel felly to which is secured a rim 3 having a peripheral channel 5 therein. Fitted within the channel 5 is the inner portion of a tire 4 of resilient material, the interior diameter of the tire 4 is greater than the diameter of the base of channel 5 of the rim 3 to afford a space through which the tire may move toward and from the base of the channel. Arranged within the channel 5 and engaging the tire 4 is a pair of spring rings 6 the diameter of which is greater than the diameter of the base of the channel, whereby the tire is maintained normally away from said base. The rings 6 are supported away from the base of the channel 5 at intervals around the tire by suitable blocks 7 engaging the base of the channel 5 and the rings 6.

Extending centrally through the tire 4 is a ring 8 which is embraced by the outer ends of radially arranged bolts 9 which extend through the rim 3 and felly 1 and are provided on their inner ends with nuts 10 adapted to engage the felly to hold the tire in place and retain it within the channel 5. These bolts 9 also extend through the blocks 7 and serve to maintain them properly spaced around the tire.

In order to prevent lateral displacement of the spring rings 6 away from each other, I provide a series of links or bands 11 arranged at intervals around the tire and as shown in detail in Fig. 4.

In order to permit the parts of the tire to be applied to or removed from the wheel, the tire 4 and rings 6 and 8 are cut or separated as on the line 12 and the cut portions of the rings 6 and 8 are held in place by tubes 13 and 14, respectively, which are secured to said rings and one side of the cut portions thereof and thus enable the rings 6 and 8 and tire 4 to be separated on the line 12 and sprung open to permit the application of the tire to the wheel or its removal therefrom, as desired. After the tire has been applied to the wheel and the nuts 10 screwed up, the parts of the tire at the union line 12 are held firmly in place.

During the travel of the wheel, the tire 4, between the blocks 7, is permitted to move toward the base of the channel 5 against the action of the spring rings 6 thus providing a very easy action for the vehicle in passing over a road bed, the spring rings 6 maintaining the tire normally in the position shown in the drawings.

I claim—

1. The combination of a wheel rim having a peripheral channel therein, a resilient tire within said channel and having an interior diameter greater than the diameter of the base of the channel, a retaining ring extending through the tire, radially arranged bolts engaged with said ring and extending through said rim to retain the tire within the channel, a pair of spring rings laterally of said bolts and of greater diameter than the diameter of the base of the channel and engaging said tire, and means arranged at intervals around the tire to prevent movement of said rings toward the base of the channel.

2. The combination of a wheel rim having a peripheral channel therein, a resilient tire within said channel and having an interior diameter greater than the diameter of the base of the channel, a retaining ring extending through the tire, radially arranged bolts engaged with said ring and extending through said rim to retain the tire within the channel, a pair of spring rings arranged laterally of said bolts and of greater diameter than the diameter of the base of the channel and engaging said tire, and blocks arranged at intervals within the channel to prevent movement of said rings toward the base of the channel, said blocks being held in place by said bolts.

In testimony whereof I affix my signature in presence of two witnesses.

JOSEPH ALLEND.

Witnesses:
 FRANCIS DOUGHERTY,
 A. V. GROUPE.